(12) United States Patent
Zeiynali Farid et al.

(10) Patent No.: US 12,539,883 B2
(45) Date of Patent: Feb. 3, 2026

(54) ADAPTIVE VEHICLE AND TRAFFIC MANAGEMENT CONSIDERING COMPLIANCE RATES

(71) Applicants: TOYOTA MOTOR ENGINEERING & MANUFACTURING NORTH AMERICA, INC., Plano, TX (US); McMaster University, Hamilton (CA)

(72) Inventors: Yashar Zeiynali Farid, Mountain View, CA (US); Hao Yang, Burlington (CA); Seyhan Ucar, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 18/335,084

(22) Filed: Jun. 14, 2023

(65) Prior Publication Data

US 2024/0416950 A1    Dec. 19, 2024

(51) Int. Cl.
*B60W 60/00* (2020.01)
*B60W 40/04* (2006.01)
(Continued)

(52) U.S. Cl.
CPC .......... *B60W 60/001* (2020.02); *B60W 40/04* (2013.01); *B60W 50/0098* (2013.01);
(Continued)

(58) Field of Classification Search
CPC ............... B60W 60/001; B60W 40/04; B60W 50/0098; B60W 2540/00; B60W 2555/60;
(Continued)

(56) References Cited

U.S. PATENT DOCUMENTS

2020/0175880 A1\*  6/2020  Ibrahim ............... G08G 1/0129
2021/0012652 A1   1/2021  Kong
(Continued)

OTHER PUBLICATIONS

Yin, Yafeng et al., "Simultaneous determination of the equilibrium market penetration and compliance rate of advanced traveler information systems," Feb. 2003, Elsevier, Transportation Research Part A: Policy and Practice vol. 37 Issue 2, pp. 165-181 (Year: 2003).\*
(Continued)

*Primary Examiner* — Madison R. Inserra
(74) *Attorney, Agent, or Firm* — SHEPPARD, MULLIN, RICHTER & HAMPTON LLP; Daniel N. Yannuzzi

(57) ABSTRACT

A system and method is provided for implementing computer-controlled systems (e.g., vehicle safety and traffic management systems) based on compliance rates. A vehicle system and method are provided that estimate compliance rates in real-time, and have the capability to dynamically modify the computer-controlled instructions generated by a computer-controlled system (e.g., vehicle safety and traffic management systems) in a manner that improves compliance, and in-turn improves overall system performance. For (Continued)

example, a vehicle includes sensors receiving data from a plurality of communicative connected vehicles. The received data is associated with a real-time monitoring of traffic conditions for the vehicle. The vehicle also includes a controller device estimating a compliance rate in real-time based on the received data. The controller device of the vehicle also controls an automated operation of the vehicle using a modified computer-controlled instruction based on the estimated compliance rate.

21 Claims, 7 Drawing Sheets

(51) Int. Cl.
    *B60W 50/00*     (2006.01)
    *G08G 1/16*     (2006.01)
    *H04W 4/46*     (2018.01)

(52) U.S. Cl.
    CPC .......... *G08G 1/163* (2013.01); *B60W 2540/00* (2013.01); *B60W 2555/60* (2020.02); *H04W 4/46* (2018.02)

(58) Field of Classification Search
    CPC .... G08G 1/163; G08G 1/0112; G08G 1/0116; G08G 1/0133; G08G 1/0145; H04W 4/46; H04W 4/44
    See application file for complete search history.

(56) References Cited

U.S. PATENT DOCUMENTS

2022/0161800 A1*   5/2022   Hehn ................... G08G 1/0965
2022/0194385 A1*   6/2022   Geissler ............ B60W 30/0956

OTHER PUBLICATIONS

Liu et al., "Fine-Tuning ADAS Algorithm Parameters for Optimizing Traffic Safety and Mobility in Connected Vehicle Environment," Transportation Research Part C: Emerging Technologies, 76:132-149, Mar. 2017 (https://doi.org/10.1016/j.trc.2017.01.003).

Risto et al., "Assessing Driver's Ability to Estimate Compliance Rates to In-Car, Advisory Driver Support," European Transport Research Review, 6:287-294, Dec. 28, 2013 (https://doi.org/10.1007/s12544-013-0129-6).

Ardeshiri et al., "Driving Simulator-Based Study of Compliance Behavior with Dynamic Message Sign Route Guidance," IET Intelligent Transport Systems, 9(7):765-772, Sep. 2015 (https://doi.org/10.1049/iet-its.2014.0164).

Lee et al., "Advanced Traveler Information Systems and Commercial Vehicle Operations Components of the Intelligent Transportation Systems: Design Alternatives for In-Vehicle Information Displays," U.S. Federal Highway Administration, Oct. 1997, 91 pages (https://www.fhwa.dot.gov/publications/research/safety/96147/toc.cfm).

Naujoks et al., "Cooperative Warning Systems: The Impact of False and Unnecessary Alarms on Drivers' Compliance," Accident Analysis and Prevention, 97:162-175, Dec. 2016 (https://doi.org/10.1016/j.aap.2016.09.009).

* cited by examiner

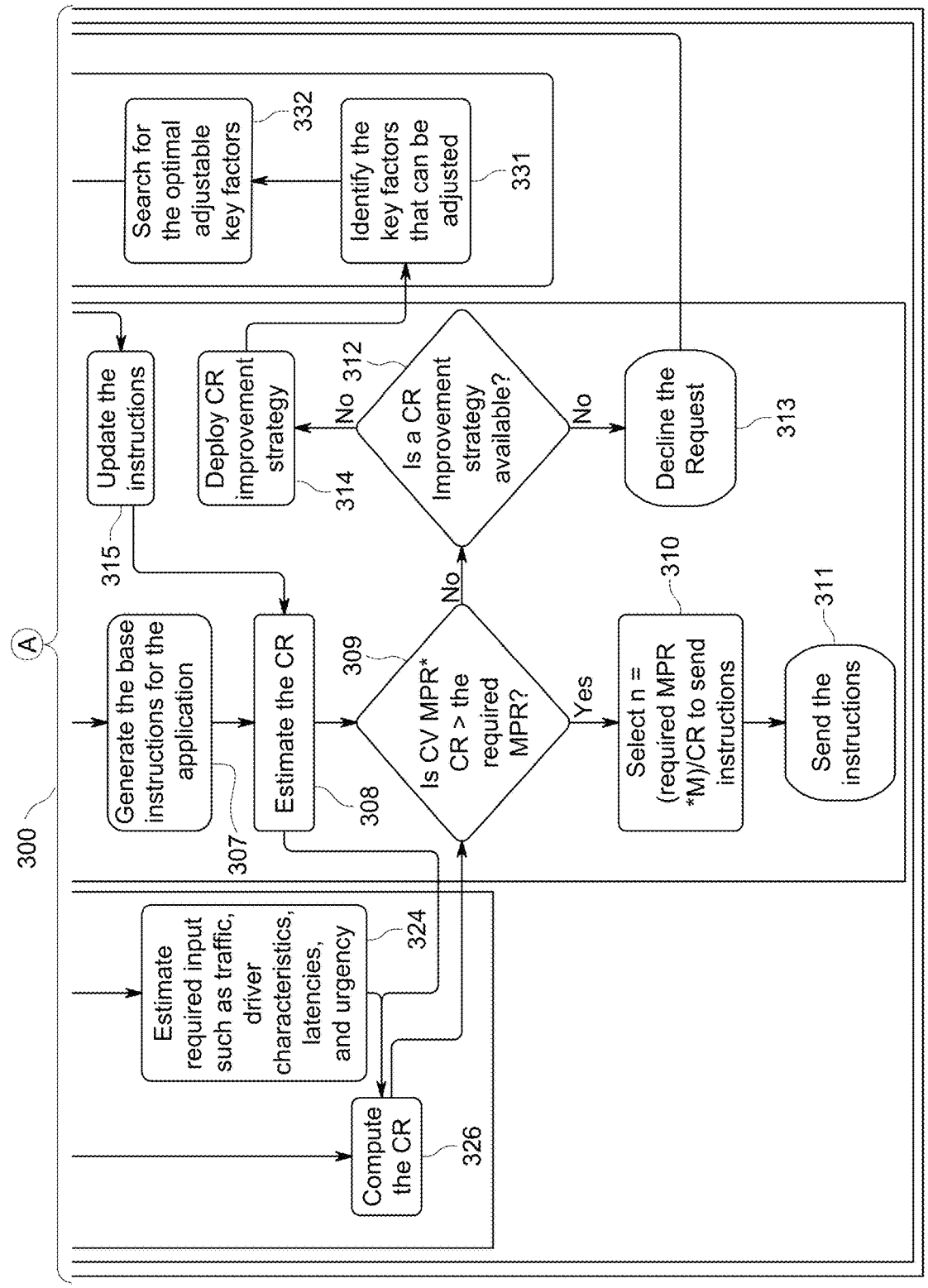
FIG. 3 (Continued...)

ADAPTIVE VEHICLE AND TRAFFIC MANAGEMENT CONSIDERING COMPLIANCE RATES

TECHNICAL FIELD

The present disclosure relates generally to vehicle communication and vehicle navigation and/or computer-controlled driving technology. In particular, considering factors such as compliance rates in determining computer-controlled driving instructions.

DESCRIPTION OF RELATED ART

Traffic detection generally involves devices or systems that have the capability to detect the presence or movement of vehicles. These device can then relay the information which is analyzed, typically by centralized servers or computational nodes, to aide in detecting real-time traffic or observing traffic patterns over time. Various types of existing traffic detection mechanisms can include: in-roadway sensors that sit under the surface (e.g., on pavement, on the surface of the road, etc.) to detect traffic-flow by detecting pressure changes that occur on the road surface; over roadway sensors (e.g., ultrasonic and passive infrared sensors) that sit above the road, and are often installed on the roadway or alongside the road, closest to vehicle movement on roads. The common types of over roadway sensors include; and navigation systems, which typically include application platforms, to collect real-time information (e.g., vehicle speed, traffic conditions, and road structures) from sensors implemented on and/or near the vehicle to remotely located centralized systems to detect the presence of traffic and recognize traffic patterns.

In many cases, traffic detection serves as the basis for handling various other operational tasks of the vehicles. For example, if a vehicle is approaching a route where traffic congestion is detected, the vehicle may be alerted to slow down or rerouted. Overall, traffic detection and management of roadways is important, as ever-increasing rates of traffic issues across roads today is becoming a challenge. However, the benefits of such traffic management and detections systems are often restricted by the compliance rates of the human drivers interacting with them. If success of an application such as incident management relies on the cooperation of certain number of drivers, low compliance rates can jeopardies the benefits. Using traffic detection systems that can also consider additional contributing factors, such as compliance rates, can be crucial in providing optimal controls and can allow for drivers and/or vehicles to make the right adjustments to make congestion easy to manage and reduce injuries.

BRIEF SUMMARY OF THE DISCLOSURE

In accordance with embodiments of the disclosed technology a vehicle which implements computer-controlled system (e.g., vehicle safety and traffic management systems) based on compliance rates, is described. A vehicle includes sensors receiving data from a plurality of communicative connected vehicles. The received data is associated with a real-time monitoring of traffic conditions for the vehicle. The vehicle also includes a controller device estimating a compliance rate in real-time based on the received data. The controller device of the vehicle also controls an automated operation of the vehicle using a modified computer-controlled instruction based on the estimated compliance rate.

In accordance with embodiments of the disclosed technology a non-transitory computer readable medium which implements computer-controlled systems (e.g., vehicle safety and traffic management systems) based on compliance rates, is described. The non-transitory computer readable medium includes instructions that cause a processor to receive data from a plurality of communicative connected vehicles. The received data is associated with a real-time monitoring of traffic conditions for the vehicle. The non-transitory computer readable medium further includes instructions that cause the processor to estimate a compliance rate in real-time based on the received data, and control an automated operation of the vehicle using a modified computer-controlled instruction based on the estimated compliance rate.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Some vehicles include computer-controlled operational modes, such as vehicles having collision avoidance systems, lane-change assistance systems, adaptive cruise control modes and automated vehicles, in which a computing system is used to generate controls that may autonomously navigate and/or maneuver the vehicle along a travel route. During lane-change assistance, for example, the driving speed of the vehicle can be limited by various factors, such as traffic congestion (e.g., preceding vehicles travelling at slower speeds, preceding vehicles stopped). Thus, by using these computer-controlled systems, it is feasible that traffic-related safety and overall mobility for the vehicle can be improved. However, in many vehicles with computer-controlled operational modes, the human driver is still given an option to ultimately accept the computer-controlled instructions as guidance. If a driver accepts the computer-controlled instruction, for example, he or she allows the vehicle to perform one or more autonomous actions such as acceleration, deceleration, or automatically maneuvering the vehicle to avoid traffic congestion and/or a collision. Nevertheless, drivers with different personal attributes may have different attitudes with respect to accepting computer-controlled traffic guidance. Some drivers may prefer not to accept the computer-controlled instructions as their driving guidance, as they trust themselves more than automation technology. Limited compliance can exacerbate these problems in cases where the performance of a system relies on the cooperation of certain number of drivers, as low compliance rates can jeopardies its benefits. Moreover, the compliance of the same driver to the same system can change over time depending on the transient factors such as traffic condition, vehicular communication latency, driver's status, and urgency of the instructions.

Therefore, the benefits and overall performance of these computer-controlled systems of a vehicle largely depend on drivers' compliance with the system. Consequently, the disclosed embodiments provide a vehicle system that can estimate compliance rates in real-time, and has the capability to dynamically modify the computer-controlled instructions generated by a computer-controlled system (e.g., vehicle safety and traffic management systems) in a manner that improves compliance, and in-turn improves overall system performance. As referred to herein, the compliance rate is defined as the proportion of the number of vehicles that accept computer-controlled instructions from vehicle safety and traffic management systems to the total number of vehicles that received the instructions.

Figure 1:
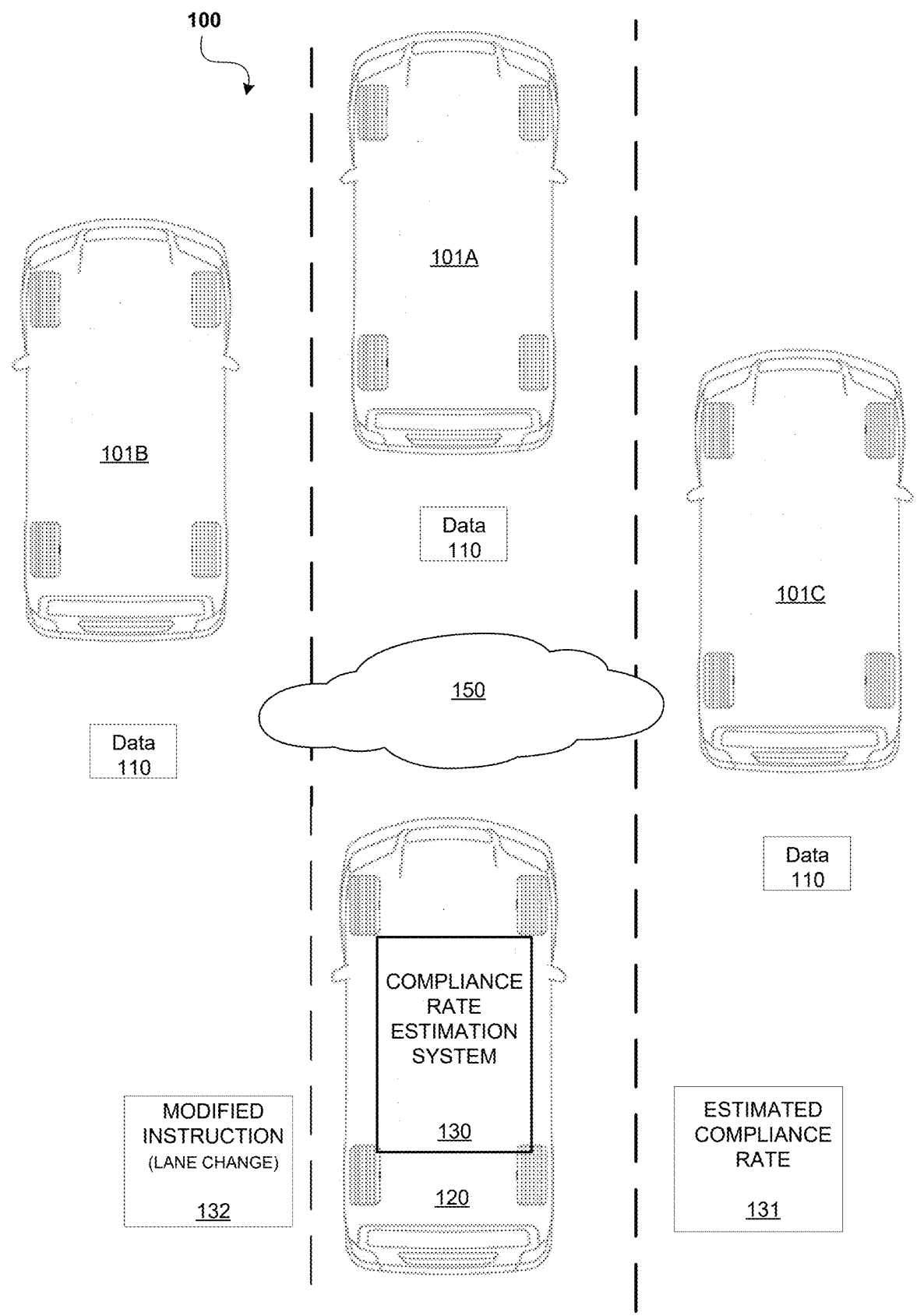
FIG. 1 is an example road environment including a vehicle utilizing compliance rate estimation during a computer-controlled operational mode, for example, in accordance with an embodiment of the technology disclosed herein.

Referring now to FIG. 1, an example of a road environment is depicted, which includes a plurality of vehicles 101A-101C traveling on a roadway with a vehicle 120 that is configured to implement compliance rate estimation, as disclosed herein. FIG. 1 illustrates that while vehicle 120 is operational, for instance being driven while having computer-controlled operational modes (e.g., vehicle safety and traffic management systems) such as collision avoidance and/or lane-change assistance, the vehicle 120 may be traveling at a certain speed in a lane on the roadway. While vehicle 120 is being driven along the road, FIG. 1 shows that it is also surrounded by the plurality of vehicles 101A-101C. This is a common road environment in several different real life scenarios, for instance driving during rush hours, driving in densely populated areas (e.g., metropolitan areas), and the like. Further, as seen in FIG. 1, vehicle 120 is traveling directly behind vehicle 101A in the same lane.

For purposes of illustration, vehicle 101A, which is preceding the other vehicles 101B, 101C, and 120 on the roadway, is approaching upcoming traffic congestion where other vehicles (not shown) ahead on the roadway are traveling at a significantly reduced speed (or completely stopped). As a result, vehicle 101A may be traveling at a slower rate of speed than vehicle 120 and the other vehicles 101B, 101C that are riding in the other lanes of the roadway. In the example, vehicles 101B, 101C may initially be moving faster than vehicle 101A, but eventually need to adjust their speed to slow down due to upcoming traffic, and thus will end up traveling at the same speed as the slower vehicle 101A that is in front of vehicle 120. Accordingly, in this scenario, vehicle 120 may be described as being in a lane of a roadway that is experiencing traffic congestion. By employing the compliance rate estimation system 130, vehicle 120 has the capability to leverage a communication network 150 between the other communication-capable vehicles 101A-101C in its vicinity on the road in order to collect real-time data which indicative of monitoring the current traffic conditions and characteristics of the driver, and further estimates a real-time compliance rate 131 based on the data from the communicatively connected vehicles.

According to the embodiments, the vehicle 120 can employ the compliance rate estimation system 130 to analyze received real-time data from the neighboring vehicles 101A-101C in order to estimate factors related to monitoring current traffic conditions (e.g., density, traffic flow, etc.) and the status of human drivers (e.g., driver age, etc.). Furthermore, the compliance rate estimation system 130 employs an artificial intelligence (AL)/machine learning (ML) model which receives these estimations related to the current traffic conditions (also referred to herein as traffic status) and the driver status as input to make a prediction which generates the estimated real-time compliance rate 131.

In an embodiment, the compliance rate estimate system 130 may perform functions of a conventional vehicle safety and/or traffic management system, such as lane-change assistance. For example, the compliance rate estimate system 130 can generate one or more computer-controlled instructions that provides guidance to the driver of vehicle 120, such as implementing semi-autonomous (e.g., partially computer-controlled) or fully autonomous operations for a vehicle 120, for a computer assisted lane to avoid the traffic congestion that is ahead in its current lance. However, the compliance rate estimation system 130 realized enhancements to these conventional system, by applying the estimated compliance rate 131 to generate a dynamically modified (or new) instruction 132 in real-time, which adjusts an initial computer-controlled instruction to specifically optimize compliance (e.g., improving the likelihood that the instruction will be used by more drivers) while still achieving the overall safety goal of the system (e.g., lane change to avoid downstream incidents). Examples of computer-controlled instructions 132 that can be generated by the system 130 can include, but are not limited to: increasing speed; decreasing speed; changing directions; lane change; and the like.

Also, the plurality of vehicles on the roadway depicted in FIG. 1 are sensor-rich vehicles (SRVs) that are equipped with vehicles sensors, described herein as ranging sensors (e.g., cameras, LIDAR, radar, ultrasonic sensors) and, in some cases, advanced computational resources. Particularly in the example of FIG. 1, vehicles 101A-101C and 120 are implemented as SRVs. Accordingly, as SRVs, vehicles 101A-101C and 120 are enabled to utilize these advances sensors to sense various conditions on the roadway, and obtain data that is pertinent to traffic, such as, but not limited to: vehicle identifiers; the presence of other vehicles; vehicle position; vehicle speed; vehicle movement; vehicle motion direction; road data; lane data; vehicle acceleration; other static and dynamic objects; image data; planned route data, generated HD local map, processed perception data, and the like. Additionally, the vehicles 101A-101C and 120 can have sensor capabilities that are associated with legacy vehicles (LVs), having sensors that are capable of sensing and communicating more basic types of vehicle data, such as vehicle identifiers, vehicle location, vehicle speed, vehicle acceleration, and the like. Thus, the vehicles 101A-101C and 120 can include Global Positioning System (GPS) sensors, which can provide the basic location, velocity, and acceleration of the vehicle.

Additionally, FIG. 1 shows that that data 110, generated by real-time monitoring performed by 101A-101C, can be communicated to the vehicle 120, via the communication network 150 (from the other communicatively connected vehicles 101A-101C within the vicinity on the roadway). The data 130 can include real-time data collected by the vehicle-sensors of vehicles 101A-101C, wherein the data 130 conveys information that is related to current traffic conditions, such as congestion level, traffic density, traffic flow, average speed. In some embodiments, the data 110 includes information related to the current status of the driver, such as the driver's age, gender, and the like. For example, a vehicle may have sensors on the steering wheel that can measure biometric characteristics of the driver, or a camera that can capture images that include facial features of the driver. The data 110 can include other related real-time data which is pertinent to traffic, compliance, human drivers, and vehicles that can be obtained and transmitted from the vehicles 101A-101C. The vehicles 101A-101C and 120 can have vehicle-to-vehicle (V2V) communication capabilities. Thus, vehicles 101A-101C and 120 utilize V2V communication capabilities to form a communication network 150 supported using V2V technology (as the vehicles are within range for V2V-based wireless communication), and wirelessly exchange information, such as speed and position of surrounding vehicles. That is, in road environment of FIG. 1, V2V enables all of the vehicles 101A-101C, and 120 to be able to communicate with each other. Vehicle 120 can receive and analyze the received data 110, and employ other vehicle components and/or systems, such as compliance rate estimation system 130, to calculate an estimated real-time compliance rate 131. The received data 110 is also used to generate a dynamically modified computer-controlled instruction 132 that triggers automated actions in order to avoid crashes, eases traffic congestion, improves the overall road environment, and further is optimized to improve the estimated compliance rate 132. The cooperative (or federated) learning between a plurality of communicatively connected vehicles is a key aspect of the compliance rate estimation techniques, as disclosed herein. Particularly, by utilizing larger data sets from multiple data points (several connected vehicles) it enables AI/ML models that are generated by the compliance rate estimation system 130 to achieve enhanced accuracy in its data analysis and analytical forecasting, to generate the estimated compliance rate 131 in real-time. Furthermore, the compliance rate estimation system 130 can generate the modified instruction 132 based on an improved compliance rate which is also determined using the cooperation between communicatively connection vehicles.

In some embodiments, the SRVs, namely vehicles 101A-101C and 120 also include vehicle-to-infrastructure (V2I) and/or vehicle-to-everything (V2X) capabilities. Accordingly, vehicles 101A-101C and 120 can employ V2I and/or V2X communication to wireless exchange additional data between the vehicles and road infrastructure. Thus, in some cases, the network 150 can include infrastructure components such as lane markings, road signs, and traffic lights can wirelessly provide information to the vehicle, and vice versa. Consequently, the data 110 can include additional data obtain from these infrastructure components in V2I and V2X communication, allowing the compliance rate estimation system to have a vast amounts real-time, information rich, data that is related to traffic condition, characteristics of the driver, compliance, and additional factors such as road safety, energy savings, and traffic efficiency on the roads in order to further enhance the accuracy and the overall performance of its functions. In some embodiments, the vehicle 120 is further configured to employ the bidirectional communication to V2I and/or V2X to also provide the roadside units, cloud/edge servers, and traffic monitoring centers, with notifications of traffic and/or compliance rates, when required and/or requested from the infrastructure.

FIG. 1 illustrates that the vehicle 120 includes a compliance rate estimation system 130. The compliance rate estimation system 130 can be implemented as a vehicle controller, computing hardware, software, firmware, or a combination thereof, which is programmed to perform several functions, including: leveraging communication with multiple connected vehicles (shown as vehicles 101A-101C) in order to estimate compliance rates in real-time; performing defined strategies to improve compliance rate; and dynamically adjusting computer-controlled instructions in real-time to optimize the compliance rate, in accordance with the disclosed techniques. The compliance rate estimation system 130 may be a standalone controller in some embodiments. Alternatively, the compliance rate estimation system 130 may be implemented by configuring a main vehicle onboard processor or CPU. In some embodiments, the vehicle 120 can data 110 from the other communicatively connected vehicles within its vicinity on the road (e.g., V2V network), where this data 110 is also processed by the compliance rate estimation system 130. For example, other vehicles in adjacent lanes of the road or near vehicle 120, such as vehicles 101A-101C, may capture data 110 from monitoring current traffic conditions on the roadway from varying perspectives, where the data 110 can be cooperatively fused and serve as input to the compliance rate estimation system 130 for analysis. In particular, the compliance rate estimation system 130 can implement an AI/ML model that receives the data 110 related to various key factors that may impact compliance rates (e.g., congestion level, average speed, traffic density, instruction latencies, etc.) which is trained to automatically predict the estimated real-time compliance rate 132. The compliance rate estimation system 130 can comprise a processor that is programmed with the instructions and data to perform operations that support compliance rate estimation, including: estimating required penetration rate (also referred to herein as market penetration rate) by the application; identifying key factors that can impact compliance rates such as current traffic condition, urgency of instruction, communication latency, types of messages, and reliability; using historical data to model the relationship between the compliance rates and the key factors; evaluating improvement strategies to increase the compliance rate; generating dynamically modified and/or new instructions (by modifying adjustable key factors to optimize the compliance rate) that are optimal for compliance; and selecting connected vehicles based on the estimated compliance rate and the required market penetration rate and send instructions. In an embodiment, the compliance rate estimation system 130 is configured to implement the process depicted in FIG. 3. Functions that are particularly executed to implement the compliance rate estimation techniques, as disclosed herein, are described in greater detailed in reference to FIG. 3, and are not described regarding FIG. 1 in such detail for purposes of brevity.

FIG. 1 also illustrates that the compliance rate estimation system 130 is configured to produce output that can be utilized by the vehicle 120 and/or communicated to the other communicatively connected vehicles in the vicinity, such as vehicles 101A-101C. As seen in FIG. 1, the compliance rate estimation system 130 can output a dynamically modified instruction 132 which is computer-controlled guidance that has been optimized for compliance, and thus may have a higher likelihood of compliance (e.g., being accepted by human drivers). According to the embodiments, the modified instruction 132 can be communicated to a number of connected vehicles and/or executed by the vehicle 120 itself. FIG. 1 also depicts that the compliance rate estimation system 130 generates an estimated compliance rate 131 in real-time, which may be further analyzed by the system 130 (e.g., subjected to one or more defined improvements strategies to improve the compliance rate) and/or communicated to other communicatively connected vehicles.

According to an embodiment, vehicle 120 can be an autonomous vehicle. As used herein, "autonomous vehicle" means a vehicle that configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, where each more correspondingly responds to the compliance rate estimation system 130 with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, the compliance rate techniques and response can be highly, or fully, automated. For example, the compliance rate estimation system 130 can be configured to communicate controls so as to operate the vehicle 120 autonomously and safely. For example, after the compliance rate estimation system 130 generates the modified instruction 132, the vehicle 120 operating as an autonomous vehicle, the vehicle 120 can automatically perform the necessary adjustments (e.g., lane change) with no human driver interaction. Accordingly, vehicle 120 can operate with respect to computer-controlled safety commands, or controls (based on compliance rate estimation) in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g. by depressing the brake pedal to reduce the speed of the vehicle), the adaptive cruise control system is deactivated, and the speed of the vehicle is reduced. Thus, with vehicle 120 operating as a semi-autonomous vehicle, the compliance rate techniques and response can be partially automated. In an example, the compliance rate estimation system 130 communicates a modified (or new) instruction to the vehicle 120 operating as a semi-autonomous vehicle, under adaptive cruise control features.

The vehicle 120 can automatically perform the some of the necessary adjustments (e.g., lane change) with no human driver interaction. Alternatively, the vehicle 120 may notify a driver that driver input is necessary in response to the modified instruction 132. For instance, upon detecting that there is an incident (e.g., traffic congestion) in the current lane for vehicle 120, the vehicle 120 may generate an estimated compliance rate 131 in real-time, determine that the estimated compliance rate 131 is not suitable (e.g., low compliance rate) for the particular lane-change assistance application, and for the current traffic conditions (e.g., high traffic density). As a result, the compliance rate estimation system 130 can update the lane-change instruction, generating the modified instruction 132, in a manner that is more optimal for compliance, for instance allocating more time to perform the lane change and executing the lane change as a cooperative maneuver with other connected vehicles. The modified instruction can then effectuate automatic controls (e.g., reducing speed, lane change, communicating to nearby connected vehicle) that is executed by the vehicle 120 to ensure that the driver complies and travels cautiously. In some embodiments, the vehicle 120 can also present a notification in its dashboard display that reduced speed is required, because of the safety constraints. The notification allows time for the driver to press the brake pedal and decelerate the vehicle 120 to travel at a speed that is safe.

Figure 2:
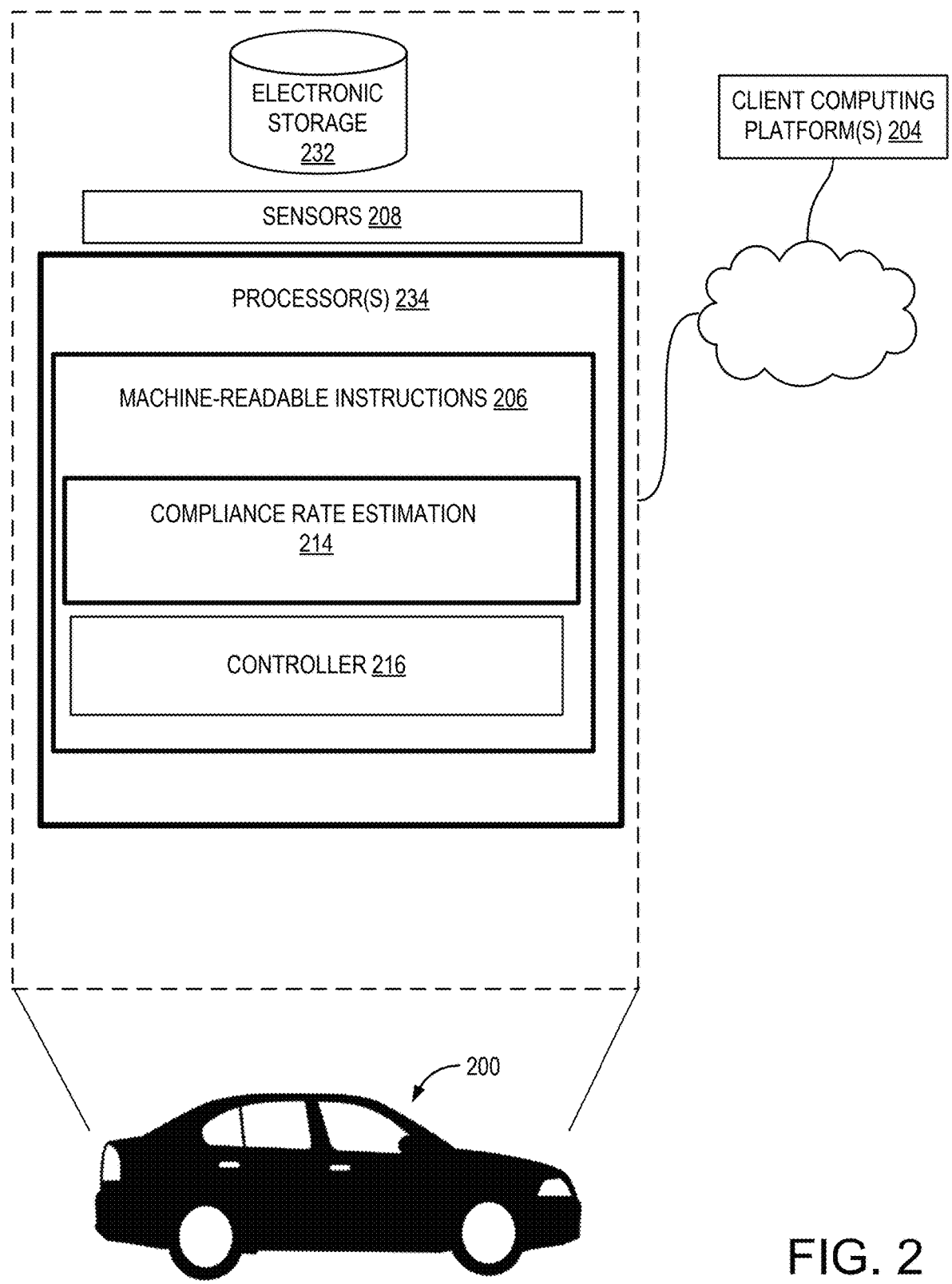
FIG. 2 is a schematic representation of an example vehicle with which embodiments of the compliance rate estimation system disclosed herein may be implemented.

FIG. 2 illustrates a vehicle 200, for instance an autonomous vehicle, configured for implementing the disclosed compliance rate estimation capabilities. In particular, FIG. 2 depicts the vehicle 200 including a compliance rate estimation component 214. According to the disclose embodiments, the compliance rate estimation component 214 is configured to execute several enhanced vehicle safety capabilities, including: estimating required penetration rate (also referred to herein as market penetration rate) by the application; identifying key factors that can impact compliance rates such as current traffic condition, urgency of instruction, communication latency, types of messages, and reliability; using historical data to model the relationship between the compliance rates and the key factors; evaluating improvement strategies to increase the compliance rate; generating dynamically modified and/or new instructions (by modifying adjustable key factors to optimize the compliance rate) that are optimal for compliance; and selecting connected vehicles based on the estimated compliance rate and the required market penetration rate and send instructions.

In some implementations, vehicle 200 may also include sensors 208, electronic storage 232, processor(s) 234, and/or other components. Vehicle 200 may be configured to communicate with one or more client computing platforms 204 according to a client/server architecture and/or other architectures. In some implementations, users may access vehicle 200 via client computing platform(s) 204.

Sensors 208 may be configured to generate output signals conveying operational information regarding the vehicle. The operational information may include values of operational parameters of the vehicle. The operational parameters of vehicle 200 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 200 tires and roadway, distance from center of gravity of vehicle 200 to front axle, distance from center of gravity of vehicle 200 to rear axle, total mass of vehicle 200, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 200. In some implementations, at least one of sensors 208 may be a vehicle system sensor included in an engine control module (ECM) system or an electronic control module (ECM) system of vehicle 200. In some implementations, at least one of sensors 208 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 208 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 200. In some implementations, sensors may also include sensors within nearby vehicles (e.g., communicating with the subject vehicle via V to V or other communication interface) and or infrastructure sensors (e.g., communicating with the subject vehicle via the V2I or other communication interface).

Sensors 208 may be configured to generate output signals conveying visual and/or contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.)), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far-left lane of a four-lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 208 may include virtual sensors, imaging sensors, depth sensors, cameras, and/or other sensors. As used herein, the term "camera", "sensor" and/or "image sensor" and/or "imaging device" may include any device that captures images, including but not limited to a single lens-based camera, a calibrated camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. The visual information captured by sensors 208 can be in the form of digital images and/or video that includes red, green, blue (RGB) color values representing the image. Information captured by one or more sensors may be marked, time-stamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 232, such that captured information may be stored, at least initially, in the integrated embedded storage of a particular vehicle, e.g., vehicle 200. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 200 may be configured by machine-readable instructions 206. Machine-readable instructions 206 may include one or more instruction components. The instruction components may include computer program components. The instruction components may include one or more of: a compliance rate estimation component 212; a controller 216, and/or other instruction components.

As a general description, the illustrated components within the machine-readable instructions 206 include the compliance rate estimation component 214. As previously described in reference to FIG. 1, the compliance rate estimation component 214 is configured to execute image capture and analysis to detect that an ado vehicle, for example, has at least one visible indication of risk factors, such as a missing or an obstructed license plate. The compliance rate estimation component 214 can utilize one or more vehicle sensors 208 (e.g., camera) to capture data that is utilized to estimate a compliance rate in real-time. The compliance rate estimation component 212 can generate a computer-controlled instruction (e.g., autonomous safety maneuver), which is dynamically modified based on the compliance rate in a manner that increases the likelihood of human compliance. The computer-controlled instructions generated by the compliance rate estimation components 214 can control the vehicle's 200 operation according to the functioning automation levels of the vehicle 200. For example, the commands generated may be specific to one or more of: level 0 (no driving automation); level 1 (driver assistance); level 2 (partial driving automation); level 3 (conditional driving automation); level 4 (high driving automation); and level 5 (full driving automation). In this way, the compliance rate estimation component 212 may execute varying levels of automation actions that control the vehicle 200.

Figure 3:
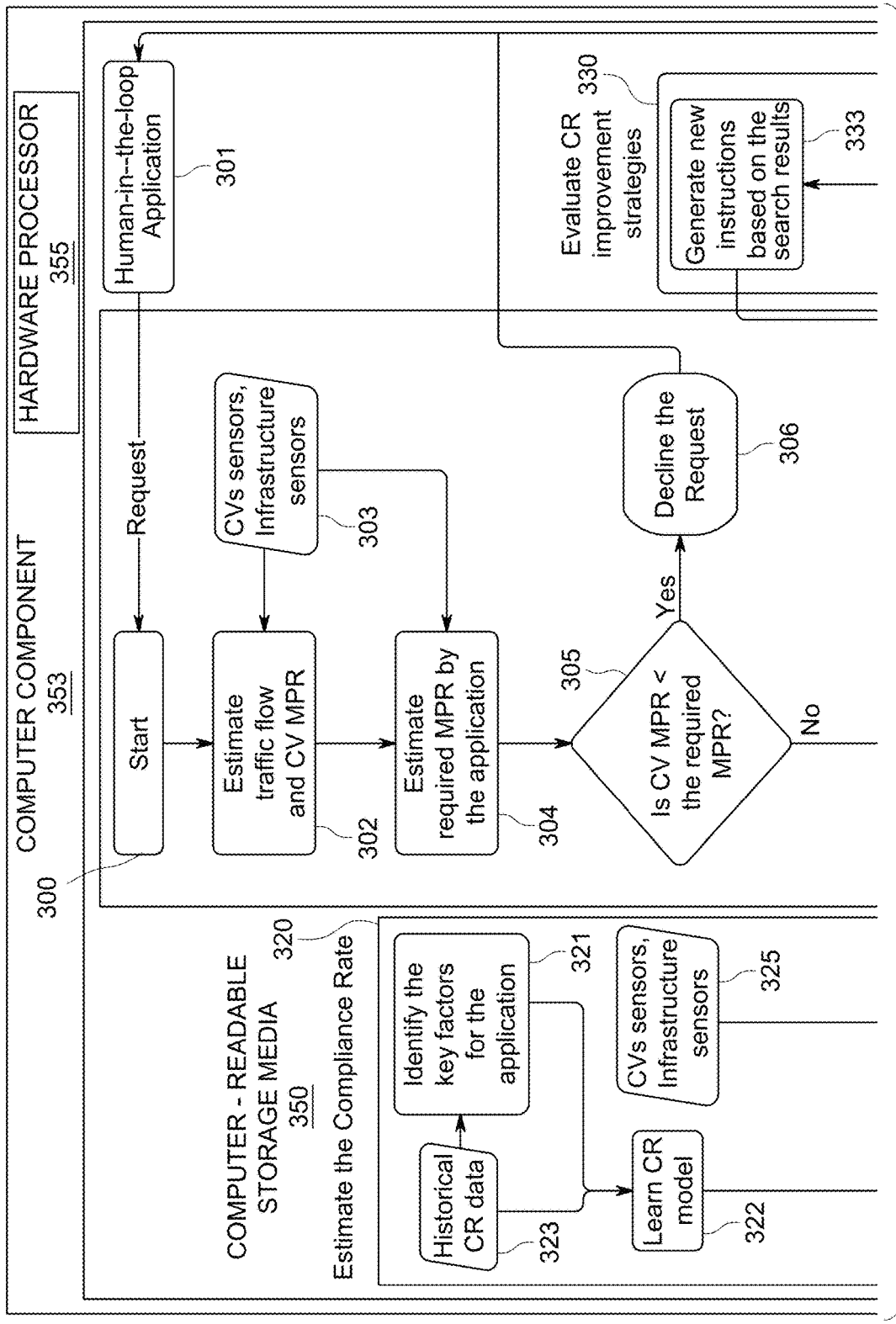
FIG. 3 depicts a flow diagram of a process implementing compliance rate estimation, in accordance with an embodiment of the technology disclosed herein.

FIG. 3 depicts an example process 300 implementing traffic management including the disclosed compliance rate estimation techniques, which ultimately improve compliance rates and optimizes the automated controls employed by vehicles for different traffic scenarios. FIG. 3 illustrates the process 300 being executed as a series of executable operations in a computer-readable storage media 350 performed by a hardware processor 355 within a computing component 353. The computing component 353 can be a computer used for implementing the disclosed compliance rate functions described herein. For example, the computing component 353 executing process 300 may be the controller device of a vehicle implementing the compliance rate estimation system described above in reference to FIG. 1.

The process 300 beings in operation 301 where the compliance estimation triggered. For example, an application sends a request for sending instructions to the connected vehicles (CVs), along with its requirements, to a compliance estimation system of vehicle. In some embodiment, the application can be implemented as an artificial intelligence (AI) and/or machine learning (ML) application, such as human-in-the-loop application. As referred to herein, a human-in-the-loop application is a type of (AI) that enables the integrated actions of humans and computer systems to complete tasks, typically with the aim of improving efficiency or accuracy. For example, operation 301 can involve a collision avoidance application of a vehicle, which executes autonomous controls of the vehicle in response to detected traffic congestion (e.g., deceleration, lane change, etc.). The vehicle's collision avoidance application may function as a form of human-in-the-loop application which utilizes human-provided inputs that initiate a start for the process 300 (performed by the vehicle), and receives AI/ML-driven feedback from the process 300 (e.g., real-time compliance rate estimation) that helps to guide and improve the performance of the application.

Next, at operation 302, the vehicle estimates traffic flow and connected vehicle (CV) and market penetration rate (MPR). As previously described, a key aspect of the compliance rate estimation techniques disclosed herein is leveraging data that can be obtained from multiple vehicles to estimate compliance rates in real-time. In accordance with the embodiments, the vehicle may be equipped with networking capabilities that allows communicative connections to a plurality of vehicles (also referred to herein as CVs) within its vicinity via a vehicle communication network (e.g., V2V, V2I, V2X, etc.).

At operation 303, the vehicle is receiving traffic related data from CVs (e.g., measured by vehicle sensors) and receiving traffic related data from road infrastructure elements, for instance utilizing V2I communication technology. As an example, operation 302 can involve the vehicle communicating request messages to the plurality of CVs over the vehicle networks, in order to collect data from these vehicles that is related to the current traffic conditions and the status of human drivers. In response to receiving a request message from the vehicle, the CVs can then communicate response messages including the pertinent data (associated with the request) back to the vehicle in operation 303 which is received by the vehicle in operation 302 for further analysis. For example, the vehicle can receive response messages from several CVs that include data relating to the traffic state, where traffic state data conveys the current traffic conditions (of the roadway traversed by the vehicles). In some embodiments, traffic related data is communicated wirelessly to the vehicle from infrastructure components such as lane markings, road signs, and traffic lights during operation 303. By collecting traffic state data from multiple sources, data representing varying perspectives on the current state of traffic is obtained and analyzed by the vehicle, and ultimately used in operation 302 to estimate traffic state factors including traffic flow, density, CV MPR, and the like.

The process 300 can then proceed to operation 304 where an MPR that is required by the particular application being employed is estimated. A specific application and/or traffic scenario that is using the data obtained from the CVs as well other data sources may require a certain MPR value(s). For instance, a low MPR might be effective if traffic density is low, while it might be ineffective when traffic density is high. Conversely, higher MPRs might be needed in application where there is high traffic densities. Thus, based on the specific application or current traffic conditions (e.g., ascertained based on the traffic state data obtained in operation 303), a required MPR can be estimated.

Subsequently, process 300 executes a conditional check in operation 305 in order to determine whether the estimated MPR of CVs (from previous operation 302) is less than the estimated required MPR for the application (from previous operation 303). If the estimated MPR of CVs is determined to be less than the required MPR by check 305 ("YES" in FIG. 3), then the process 300 continues to operation 306 where the request is declined and the process 300 terminates (returning back to operation 301). The request is declined because the application's minimum requirement in MPR to satisfy the request cannot be met, even with 100% compliance rate. However, if the estimated MPR of CVs is determined to be greater than (or equal to) the required MPR by check 305 ("NO" in FIG. 3), then the process 300 is deemed to be potentially capable of fulfilling the request based on the MPR, and the process 300 can proceed by moving to operation 307 thereafter. As an example, if the collision avoidance application is estimated to require a low value MPR in operation 304 to operate optimally because the current traffic flow conditions include low traffic density, and operation 302 estimates a higher value MPR for the CVs; then the CV MPR being greater than the application's required MPR indicates that the there is enough market penetration to continue the process 300 and generate a substantially accurate estimate for compliance rates.

At operation 307, the vehicle generates base instructions for the application. The vehicle can initially generate initial instructions based on the information received from the application. Referring back to the example of a collision avoidance application, the vehicle may initially generate an automated lane change instruction for the vehicle, based on the application detecting traffic congestion ahead in the vehicle's current lane. However, as disclosed herein, another key capability of compliance rate estimation involves adjusting computer-controlled instructions in real-time to be optimized (e.g., high user compliance, adapted for specific traffic conditions, etc.) based on estimated compliance rates and other traffic related factors cooperatively determined from communication with connected vehicles. Thus, the process 300 can later perform a modification and/or optimization to the base instructions generated in operation 307 based on the real-time compliance rate estimations generated by the process 300.

Following operation 307, the process 300 moves to operation 308 which estimates the compliance rate (CR). For each application, a compliance rate can be affected based on various factors such as driver's age, type of the instruction, and the like. FIG. 3 illustrates that estimating the compliance rate, which is performed by operation 308, particularly includes several steps depicted as a sub-process 320.

The sub-process 320 for estimating the compliance rate includes operations 321-326. The sub-process 320 may begin at operation 321, where the key factors for the application are identified. In other words, specific factors that may affect the compliance rate for the particular application are identified in operation 321. Examples of factors that may impact a compliance rate can include, but are not limited to: driver socio-economic characteristics (e.g., age, income, etc.), traffic condition (e.g., density, average speed, etc.), communication features, familiarity, urgency of the instructions, safety concerns, system reliability, type of the instructions, and the like. The types of factors can vary for different applications.

Next, at operation 322, a CR model is trained. Using the key factors affecting compliance rate that were identified in previous operation 321, and historical data on the drivers' compliance that can be obtained in operation 323 as input data, an AI/ML model can be trained. According to the embodiments, the CR model is trained to automatically learn trends in observed compliance rates over time and consequently output a compliance rate based from its learning on the input data (e.g., the key factors). Thus, the CR model generated and trained in operation 322 can utilize AI/ML-based algorithms and artificial neural networks, and as a result can automatically execute a logical prediction on compliance rate using available information and input data sets. As a result, the CR model which learns based on collected training data can recognize historical patterns and ultimately make a prediction of a compliance rate based on current real-time data.

The sub-process 320 continues to operation 324, which estimates various inputs, for instance real-time data, that may affect the compliance rate. These inputs may be employed as input data into the CR model generated and/or trained in previous operation 322. Examples of input data that can be estimated in operation 324 include, but are not limited to: real-time traffic data; human driver characteristics; latencies; urgencies; and the like. As previously described, data that is related to real-time monitoring of traffic and human driver conditions may be received from CVs (e.g., vehicle sensors) and infrastructure elements (e.g., infrastructure sensors) in operation 325 over communication networks (e.g., V2V, V2I, V2X, etc.).

For example, the plurality of CVs can be utilized to monitor real-time traffic conditions, including congestion level, status of road events, relative locations of CVs to the control points, and the like. In some embodiments, CVs may be equipped with sensors that are also capable of monitoring the status of a human drivers, such as sensor measuring driver biometrics, visual images (e.g., cameras) of the driver, and the like. Consequently, operation 324 can utilize data collected from real-time human driver monitoring to estimate several driver related conditions, such as age, and the like. Operation 324 can also involve estimating instruction latencies from computation and vehicular communications, and assessing an urgency and/or necessity of any computer-controlled instructions that are generated by the application.

Subsequently, the sub-process 320 moves to operation 326 which computes, or otherwise estimates a compliance rate. In accordance with the embodiments, operation 326 utilizes the CR model trained in previous operation 322 generated instructions, and the input data estimated in previous operation 324 to estimate a real-time compliance rate. After the compliance rate is estimated in operation 326, the sub-process 320 is considered complete and the process 300 then proceeds to operation 309.

At operation 309, a condition check is performed to determine whether the CVs that can potentially follow the instructions (e.g., CV MPR multiplied by the estimated real-time compliance rate) is greater than the required CV MPR that was estimated in previous operation 304. If the number of CVs that can potentially follow the instructions is greater than the required MPR for the application (shown in FIG. 3 as "YES"), then the estimated compliance rate is deemed appropriate for the application, and consequently there is no need to improve the compliance rate. In this case, the process 300 moves to operation 310 which selects a number of CVs (n), and transmits the generated instruction (s) to each of the n vehicles. The number of vehicles (n) selected in operation 310 is based on the real-time compliance rate estimated in previous operation 308, and can be represented mathematically as:

$$n = \frac{\text{required } MPR * M}{CR} \quad (1)$$

where MPR is the market penetration rate required by the application,

M is the total number of vehicles and

CR is the estimated real-time compliance rate.

As a general description, equation (1), involves taking M, which is a known value representing the total number of vehicles (connected and non-connected). Then, multiplying M by the required MPR to derive the number of required connected vehicles. Thereafter, dividing by the computed compliance rate CR, will result in the total number of connected vehicles n to receive the instructions.

The number of vehicles n selected in operation 310 can also involve the consideration of additional factors, such as safety, efficiency and comfort of the drivers. After the number of CVs is calculated, process 300 moves to operation 311 and transmits the computer-controlled instruction to each of the n number of communicatively connected vehicles.

Referring back to the conditional check of operation 309, if the number of CVs that can potentially follow the instructions is less than (or equal to) the required MPR for the application (shown in FIG. 3 as "NO"), then the estimated real-time compliance rate is deemed to not be suitable for the application. Consequently, it may be beneficial to improve the compliance rate and the process 300 can ultimately perform a compliance rate improvement sub-process 300 in order to optimize both the compliance and the computer-controlled instruction(s).

After determining that the estimated real-time compliance rate should be improved based on the conditional check in operation 309, the process 300 moves to operation 312 to further determine whether a strategy to improve the compliance rate has been defined. If operation 312 detects that an improvement strategy is not available (shown in FIG. 3 as "NO"), then the application's request cannot be fulfilled, and operation 313 declines the request. Alternatively, if operation 312 detects that a defined improvement strategy is available, then the process 300 goes to operation 314 next.

At operation 314, the defined strategy for improving the compliance rate is deployed. As seen in FIG. 3, the process 300 can activate the strategy to improve the compliance rate in operation 314, which particularly includes performing a series of steps in a sub-process 330. The sub-process 330 generally involves evaluating compliance rate improvement strategies.

Sub-process 330 can begin at operation 331, where the key factors that can be adjusted are identified. As previously alluded to, there may be several key factors that can impact a compliance rate (e.g., operation 321). Accordingly, based on a selected strategy, operation 331 can identify particular factors that are adjustable. By adjusting these factors, the compliance rate can be dynamically modified.

After one or more adjustable factors are identified, the sub-process 330 executes operation 332 which searches for optimal adjustable factors. That is, an optimal value for an adjustable factor can be calculated. An optimal value for an adjustable factor is the value which results in the required compliance rate for the application (determined in operation 304). For example, in lane-change assistant application, when a driver is close to an incident, changing lanes could be an urgent concern for the human driver. However, changing lanes in a few seconds could be dangerous and difficult. Hence, the instruction should be re-assessed to include speed control factor, which may ultimately yield an increase in the compliance rate (to the required value).

Subsequently, the sub-process 333 continues to operation 333 which generates modified and/or new computer-controller instruction(s) based on the optimal values for the adjustable factors that were determined in previous operation 332. After the new and/or modified instructions(s) are generated in operation 333, the sub-process 330 is considered complete and the process 300 then proceeds to operation 315. In operation 315, the initially generated base instruction(s) from previous operation 307 are updated based on the improvement strategy executed in the sub-process 330 which improves the compliance rate. For example, the new and/or modified instruction(s) instructions can replace the base instruction(s) that were initially generated by the application without considering compliance rate. The process 300 distinctly analyzes contributions that compliance rates make to the overall performance of vehicle applications, and leverages cooperation from communicatively connected vehicles to estimate compliance rates in real-time; and dynamically adjust computer-controlled instructions to be optimized based on these compliance rates in a manner that is lends itself to human drivers actually utilizing the instruction(s). Consequently, the process 300 realizes a real-time compliance rate estimation, which thereby can be utilized to improve compliance rates and achieve system goals.

FIG. 3 also illustrates that the process 300 can be iterative, where the updated and/or modified instruction(s), generated based on the disclosed compliance rate estimation techniques, will be used to estimate the compliance rate again (step 6) and the process 330 will be repeated to further refine the compliance rate estimation.

Figure 4:
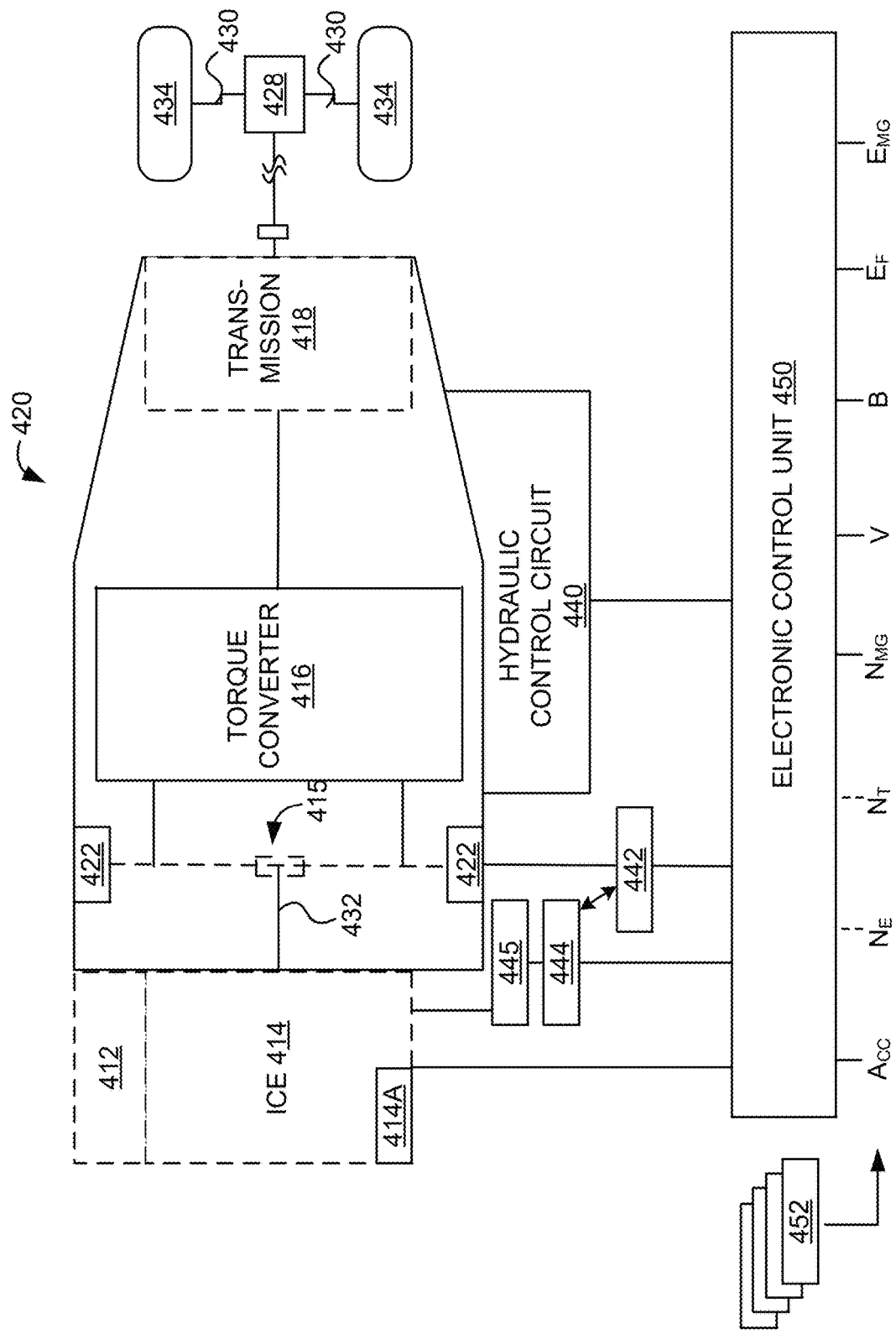
FIG. 4 illustrates an example vehicle with which embodiments of the disclosure may be implemented.

FIG. 4 illustrates a drive system of a vehicle 420 that may implement the compliance rate estimation systems and techniques disclosed herein. The vehicle 420 is shown to include an internal combustion engine 414 and one or more electric motors 422 (which may also serve as generators) as sources of motive power. Driving force generated by the internal combustion engine 414 and motors 422 can be transmitted to one or more wheels 434 via a torque converter 416, a transmission 418, a differential gear device 428, and a pair of axles 430.

Vehicle 420 may be driven/powered with either or both of engine 414 and the motor(s) 422 as the drive source for travel. For example, a first travel mode may be an engine-only travel mode that only uses internal combustion engine 414 as the source of motive power. A second travel mode may be an EV travel mode that only uses the motor(s) 22 as the source of motive power. A third travel mode may be a hybrid electric vehicle (HEV) travel mode that uses engine 414 and the motor(s) 422 as the sources of motive power. In the engine-only and HEV travel modes, vehicle 420 relies on the motive force generated at least by internal combustion engine 414, and a clutch 415 may be included to engage engine 414. In the EV travel mode, vehicle 420 is powered by the motive force generated by motor 422 while engine 414 may be stopped and clutch 15 disengaged.

Engine 414 can be an internal combustion engine such as a gasoline, diesel or similarly powered engine in which fuel is injected into and combusted in a combustion chamber. A cooling system 412 can be provided to cool the engine 414 such as, for example, by removing excess heat from engine 414. For example, cooling system 412 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 414. In other applications, either or both the water pump and the fan may be operated by electric current such as from battery 444.

An output control circuit 414A may be provided to control drive (output torque) of engine 414. Output control circuit 414A may include a throttle actuator to control an electronic throttle valve that controls fuel injection, an ignition device that controls ignition timing, and the like. Output control circuit 414A may execute output control of engine 414 according to a command control signal(s) supplied from an electronic control unit 450, described below. Such output control can include, for example, throttle control, fuel injection control, and ignition timing control.

Motor 422 can also be used to provide motive power in vehicle 420 and is powered electrically via a battery 444. Battery 444 may be implemented as one or more batteries or other power storage devices including, for example, lead-acid batteries, lithium ion batteries, capacitive storage devices, and so on. Battery 444 may be charged by a battery charger 445 that receives energy from internal combustion engine 414. For example, an alternator or generator may be coupled directly or indirectly to a drive shaft of internal combustion engine 414 to generate an electrical current as a result of the operation of internal combustion engine 414. A clutch can be included to engage/disengage the battery charger 445. Battery 444 may also be charged by motor 422 such as, for example, by regenerative braking or by coasting during which time motor 422 operate as generator.

Motor 422 can be powered by battery 444 to generate a motive force to move the vehicle and adjust vehicle speed. Motor 422 can also function as a generator to generate electrical power such as, for example, when coasting or braking. Battery 444 may also be used to power other electrical or electronic systems in the vehicle. Motor 422 may be connected to battery 444 via an inverter 442. Battery 444 can include, for example, one or more batteries, capacitive storage units, or other storage reservoirs suitable for storing electrical energy that can be used to power motor 422. When battery 444 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 450 (described below) may be included and may control the electric drive components of the vehicle as well as other vehicle components. For example, electronic control unit 450 may control inverter 442, adjust driving current supplied to motor 422, and adjust the current received from motor 422 during regenerative coasting and breaking. As a more particular example, output torque of the motor 422 can be increased or decreased by electronic control unit 450 through the inverter 442.

A torque converter 416 can be included to control the application of power from engine 414 and motor 422 to transmission 418. Torque converter 416 can include a viscous fluid coupling that transfers rotational power from the motive power source to the driveshaft via the transmission. Torque converter 416 can include a conventional torque converter or a lockup torque converter. In other embodiments, a mechanical clutch can be used in place of torque converter 416.

Clutch 415 can be included to engage and disengage engine 414 from the drivetrain of the vehicle. In the illustrated example, a crankshaft 432, which is an output member of engine 414, may be selectively coupled to the motor 422 and torque converter 416 via clutch 415. Clutch 415 can be implemented as, for example, a multiple disc type hydraulic frictional engagement device whose engagement is controlled by an actuator such as a hydraulic actuator. Clutch 415 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit 440. When clutch 415 is engaged, power transmission is provided in the power transmission path between the crankshaft 432 and torque converter 416. On the other hand, when clutch 415 is disengaged, motive power from engine 414 is not delivered to the torque converter 416. In a slip engagement state, clutch 415 is engaged, and motive power is provided to torque converter 416 according to a torque capacity (transmission torque) of the clutch 415.

As alluded to above, vehicle 420 may include an electronic control unit 450. Electronic control unit 450 may include circuitry to control various aspects of the vehicle operation. Electronic control unit 450 may include, for example, a microcomputer that includes a one or more processing units (e.g., microprocessors), memory storage (e.g., RAM, ROM, etc.), and I/O devices. The processing units of electronic control unit 450, execute instructions stored in memory to control one or more electrical systems or subsystems in the vehicle. Electronic control unit 450 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 4, electronic control unit 450 receives information from a plurality of sensors included in vehicle 420. For example, electronic control unit 450 may receive signals that indicate vehicle operating conditions or characteristics, or signals that can be used to derive vehicle operating conditions or characteristics. These may include, but are not limited to accelerator operation amount, ACC, a revolution speed, NE, of internal combustion engine 14 (engine RPM), a rotational speed, NMG, of the motor 422 (motor rotational speed), and vehicle speed, NV. These may also include torque converter 416 output, NT (e.g., output amps indicative of motor output), brake operation amount/pressure, B, battery SOC (i.e., the charged amount for battery 444 detected by an SOC sensor). Accordingly, vehicle 420 can include a plurality of sensors 452 that can be used to detect various conditions internal or external to the vehicle and provide sensed conditions to engine control unit 450 (which, again, may be implemented as one or a plurality of individual control circuits). In one embodiment, sensors 452 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 452 can be configured to detect, and/or sense position and orientation changes of the vehicle 420, such as, for example, based on inertial acceleration. In one or more arrangements, the electronic control unit 450 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 450 receives signals from a speedometer to determine a current speed of the vehicle 420.

In some embodiments, one or more of the sensors 452 may include their own processing capability to compute the results for additional information that can be provided to electronic control unit 450. In other embodiments, one or more sensors may be data-gathering-only sensors that provide only raw data to electronic control unit 50. In further embodiments, hybrid sensors may be included that provide a combination of raw data and processed data to electronic control unit 450. Sensors 452 may provide an analog output or a digital output. Additionally, as alluded to above, the one or more sensors 452 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 452 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 452 can be configured to acquire, and/or sense driving environment data. For example, environment sensors can be configured to detect, quantify and/or sense objects in at least a portion of the external environment of the vehicle 420 and/or information/data about such objects. Such objects can be stationary objects and/or dynamic objects. Further, the sensors can be configured to detect, measure, quantify and/or sense other things in the external environment of the vehicle 420, such as, for example, lane markers, signs, traffic lights, traffic signs, lane lines, crosswalks, curbs proximate the vehicle 420, off-road objects, etc.

Sensors 452 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 452 can be configured to acquire, and/or sense driving environment data. For example, environment sensors can be configured to detect, quantify and/or sense objects in at least a portion of the external environment of the vehicle 420 and/or information/data about such objects. Such objects can be stationary objects and/or dynamic objects. Further, the sensors can be configured to detect, measure, quantify and/or sense other things in the external environment of the vehicle 420, such as, for example, lane markers, signs, traffic lights, traffic signs, lane lines, crosswalks, curbs proximate the vehicle 420, off-road objects, etc.

Figure 5:
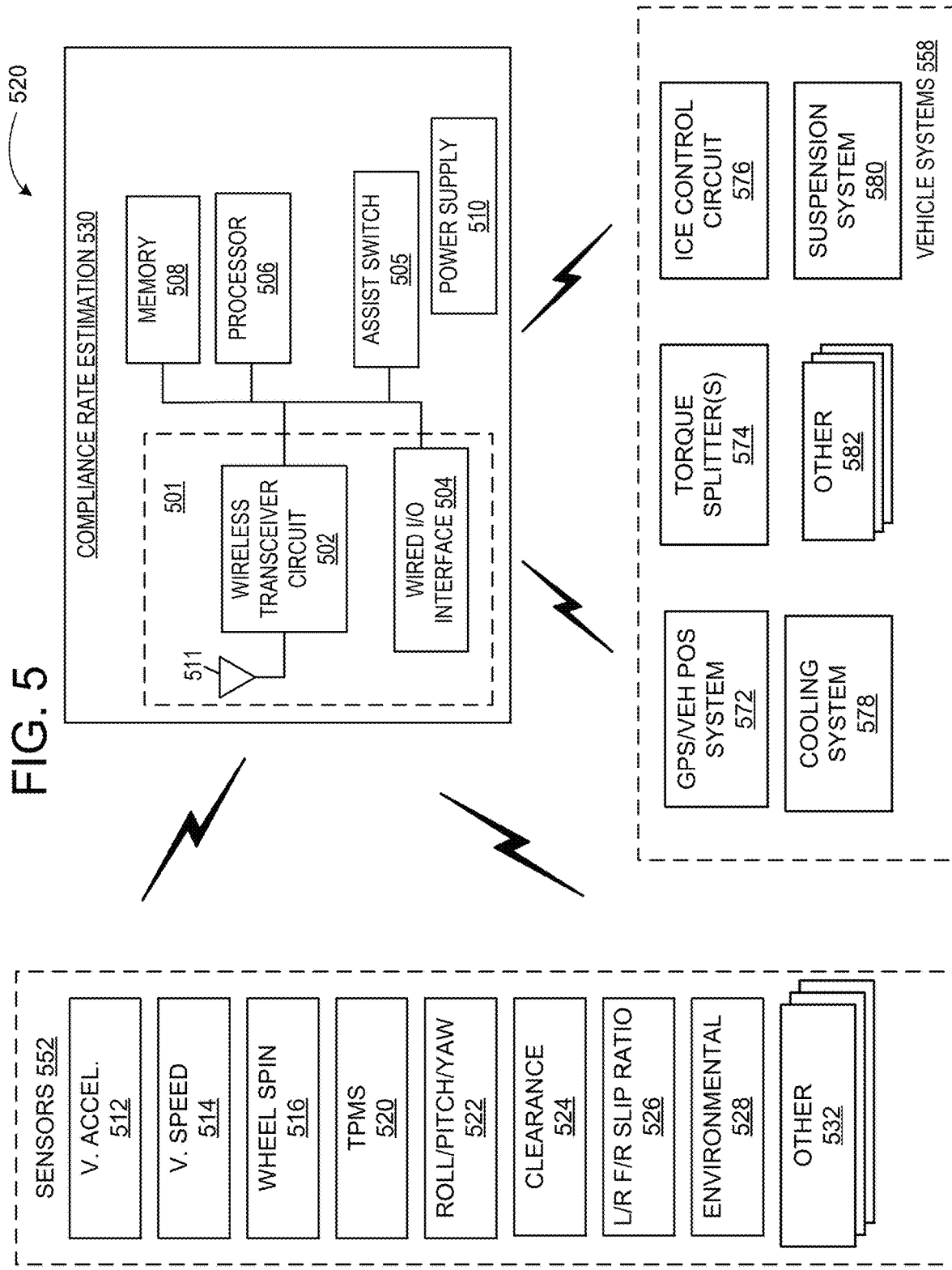
FIG. 5 illustrates an example communication architecture of a vehicle implementing compliance rate estimation shown in FIG. 1, in accordance with one embodiment of the systems and methods described herein.

Although the example of FIG. 5 is illustrated using processor 506 and memory 508, as described below with reference to circuits disclosed herein, compliance rate estimation controller 530 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up the cooperative traffic congestion detection controller 125.

Communication circuit 501 either or both a wireless transceiver circuit 502 with an associated antenna 511 and a wired I/O interface 504 with an associated hardwired data port (not illustrated). As this example illustrates, communications with cooperative traffic congestion detection controller 525 can include either or both wired and wireless communications circuits 501. In some embodiments, the communication circuit 501 may implement the IR wireless communications from the vehicle to a hydrogen fueling station. Wireless transceiver circuit 502 can include a transmitter and a receiver (not shown) to allow wireless communications via any of a number of communication protocols such as, for example, WiFi®, Bluetooth®, near field communications (NFC), Zigbee®, IrDA, and any of a number of other wireless communication protocols whether standardized, proprietary, open, point-to-point, networked or otherwise. Antenna 511 is coupled to wireless transceiver circuit 502 and is used by wireless transceiver circuit 502 to transmit radio signals wirelessly to wireless equipment with which it is connected and to receive radio signals as well. These RF signals can include information of almost any sort that is sent or received by cooperative traffic congestion detection controller 525 to/from other entities such as sensors 552 and vehicle systems 558.

Wired I/O interface 504 can include a transmitter and a receiver (not shown) for hardwired communications with other devices. For example, wired I/O interface 504 can provide a hardwired interface to other components, including sensors 552 and vehicle systems 558. Wired I/O interface 504 can communicate with other devices using Ethernet or any of a number of other wired communication protocols whether standardized, proprietary, open, point-to-point, networked or otherwise.

Power supply 510 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 552 can include, for example, sensors 552 such as those described above with reference to the example of FIG. 2. Sensors 552 can include additional sensors that may or not otherwise be included on a standard vehicle with which the disclosed system is implemented. In the illustrated example, sensors 552 include vehicle acceleration sensors 512, vehicle speed sensors 514, wheelspin sensors 516 (e.g., one for each wheel), a tire pressure monitoring system (TPMS) 520, accelerometers such as a 3-axis accelerometer 522 to detect roll, pitch and yaw of the vehicle, vehicle clearance sensors 524, left-right and front-rear slip ratio sensors 526, and environmental sensors 528 (e.g., to detect salinity or other environmental conditions). Additional sensors 532 can also be included as may be appropriate for a given implementation.

Vehicle systems 558 can include any of a number of different vehicle components or subsystems used to control or monitor various aspects of the vehicle and its performance. In this example, the vehicle systems 558 include a GPS or other vehicle positioning system 572; torque splitters 574 they can control distribution of power among the vehicle wheels such as, for example, by controlling front/rear and left/right torque split; engine control circuits 576 to control the operation of engine (e.g. Internal combustion engine 414); cooling systems 578 to provide cooling for the motors, power electronics, the engine, or other vehicle systems; suspension system 580 such as, for example, an adjustable-height air suspension system, and other vehicle systems 582.

During operation, the compliance rate estimation controller 530 can receive information from various vehicle sensors 552. Also, the driver may manually activate the cruise control mode by operating switch 505. Communication circuit 501 can be used to transmit and receive information between the compliance rate estimation controller 530 and sensors 552. Also, sensors 552 may communicate with vehicle systems 558 directly or indirectly (e.g., via communication circuit 501 or otherwise).

Figure 6:
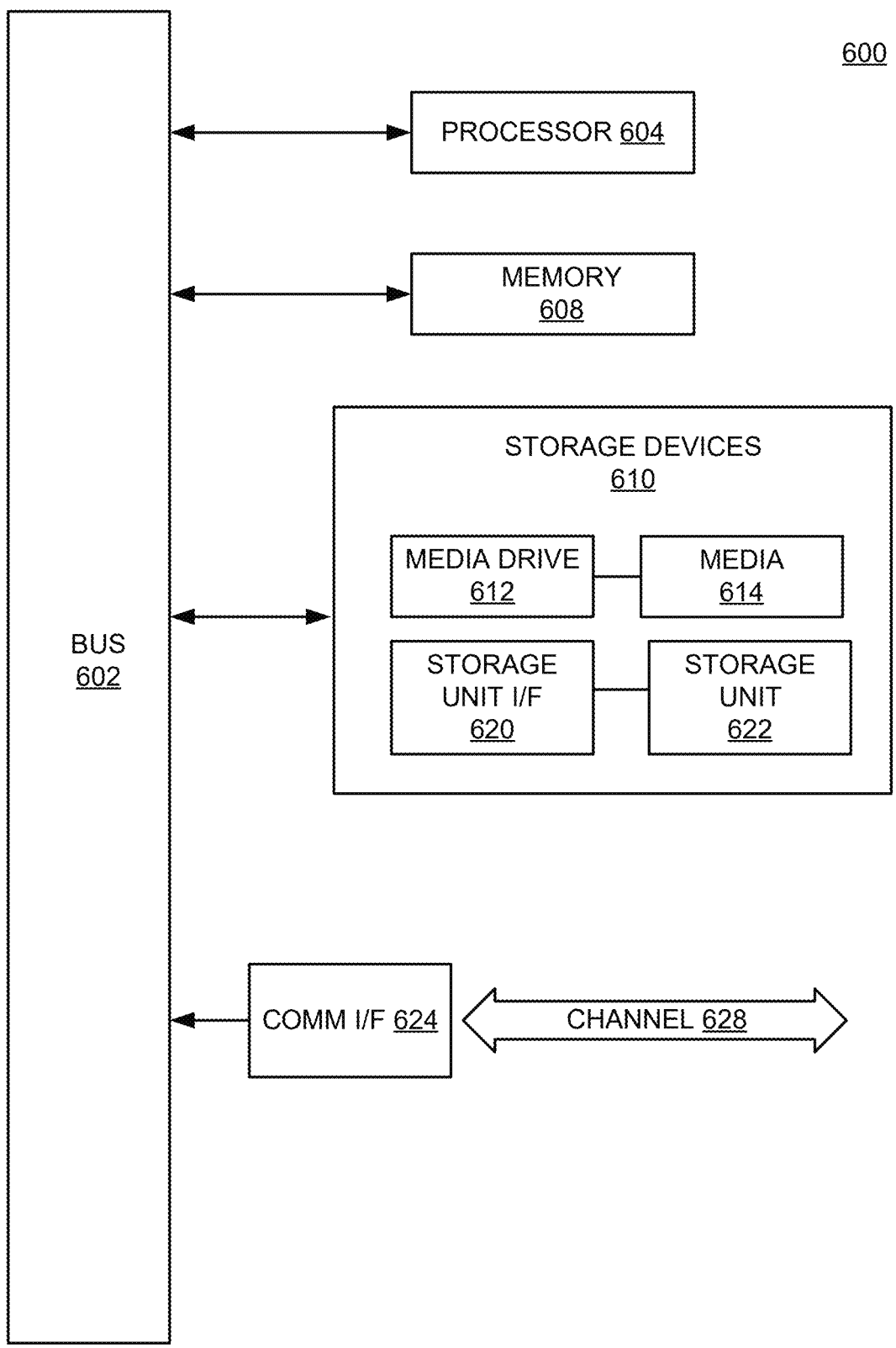
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 400.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
   sensor data received from a plurality of communicatively connected vehicles, wherein the received data is associated with a real-time monitoring of traffic conditions; and
   a controller device estimating a compliance rate in real-time based on the received data, wherein the compliance rate indicates a probability of operators of the plurality of communicatively connected vehicles accepting automated operation of their respective vehicles, wherein the controller device is configured to:
   control an automated operation of at least one of the communicatively connected vehicles using a modified vehicle control instruction based on the estimated compliance rate decreasing below a threshold value, wherein the modified vehicle control instruction is generated to increase the estimated compliance rate above the threshold value.

2. The vehicle of claim 1, wherein the controller device is further configured to generate a second modified vehicle control instruction in response to an increase of the estimated compliance rate.

3. The vehicle of claim 1, wherein the controller device estimates one or more factors associated with compliance and analyzes the one or more factors in estimating the compliance rate in real-time.

4. The vehicle of claim 3, wherein the one or more factors consist of: real-time traffic conditions, status of a driver of the vehicle, an urgency of the instruction, a communication latency, and a market penetration rate.

5. The vehicle of claim 3, wherein the modified vehicle control instruction is associated with a vehicle safety or traffic management related vehicle control operation mode of the vehicle.

6. The vehicle of claim 5, wherein the controller device estimates a required market penetration rate associated with the vehicle safety or traffic management related vehicle control operation mode of the vehicle.

7. The vehicle of claim 3, wherein the controller device applies an artificial intelligence (AI)/machine learning (ML) model using the received data as input in estimating the compliance rate in real-time.

8. The vehicle of claim 3, wherein the controller device determines whether an improvement strategy is applied to the estimated compliance rate based on an estimated required market penetration rate.

9. The vehicle of claim 8, wherein the controller device applies the improvement strategy to increase the estimated compliance rate and generate the modified vehicle control instruction.

10. The vehicle of claim 8, wherein the controller device improvement strategy modifies the one or more factors associated with compliance to increase the estimated compliance rate.

11. The vehicle of claim 10, wherein the controller device selects the communicatively connected vehicles for transmission of the modified vehicle control instruction based on the estimated compliance rate and the estimated required market penetration rate.

12. The vehicle of claim 1, wherein the plurality of communicatively connected vehicles communicate via a vehicle-to-vehicle (V2V) network.

13. The vehicle of claim 1, wherein sensors receive the sensor data from a plurality of infrastructure elements via a vehicle-to-infrastructure (V2I) network.

14. The vehicle of claim 1, wherein the compliance rate comprises a proportion of the plurality of communicatively connected vehicles whose operators accept vehicle control instructions to a total number of the plurality of communicatively connected vehicles.

15. A non-transitory computer readable medium comprising instructions, that when read by a processor, cause the processor to perform:
  receiving data from a plurality of communicatively connected vehicles, wherein the received data is associated with a real-time monitoring of traffic conditions;
  estimating a compliance rate in real-time based on the received data, wherein the compliance rate indicates a probability of operators of the plurality of communicatively connected vehicles accepting automated operation of their respective vehicles; and
  controlling an automated operation of at least one of the communicatively connected vehicles using a modified vehicle control instruction based on the estimated compliance rate decreasing below a threshold value, wherein the modified vehicle control instruction is generated to increase the estimated compliance rate above the threshold value.

16. The non-transitory computer readable medium of claim 15, wherein the instructions further cause the processor to perform:
  generating a second modified vehicle control instruction in response to an increase of the estimated compliance rate.

17. The non-transitory computer readable medium of claim 15, wherein the instructions further cause the processor to perform:
  estimating one or more factors associated with compliance and analyzes the one or more factors in estimating the compliance rate in real-time.

18. The non-transitory computer readable medium of claim 15, wherein the instructions further cause the processor to perform:
  applying an artificial intelligence (AI)/machine learning (ML) model using the received data as input in estimating the compliance rate in real-time.

19. The non-transitory computer readable medium of claim 15, wherein the instructions further cause the processor to perform:
  determining whether to apply an improvement strategy to the estimated compliance rate; and
  in response to determining to apply the improvement strategy, applying the improvement strategy to increase the estimated compliance rate and generate the modified vehicle control instruction.

20. The non-transitory computer readable medium of claim 15, wherein the modified vehicle control instruction controls an autonomous vehicle.

21. The non-transitory computer readable medium of claim 15, wherein the compliance rate comprises a proportion of the plurality of communicatively connected vehicles whose operators accept vehicle control instructions to a total number of the plurality of communicatively connected vehicles.

* * * * *